United States Patent
Arai

(10) Patent No.: US 8,705,211 B2
(45) Date of Patent: Apr. 22, 2014

(54) INTERLEAVED CIRCUIT OF FLEXURE FOR DISK DRIVE

(71) Applicant: NHK Spring Co., Ltd., Yokohama (JP)

(72) Inventor: Hajime Arai, Aiko-gun (JP)

(73) Assignee: NHK Spring Co., Ltd., Tokyo (JP)

( * ) Notice: Subject to any disclaimer, the term of this patent is extended or adjusted under 35 U.S.C. 154(b) by 0 days.

(21) Appl. No.: 13/733,352

(22) Filed: Jan. 3, 2013

(65) Prior Publication Data

US 2013/0176646 A1 Jul. 11, 2013

(30) Foreign Application Priority Data

Jan. 5, 2012 (JP) .................................. 2012-000530

(51) Int. Cl.
*G11B 5/48* (2006.01)

(52) U.S. Cl.
USPC ........................................................ 360/245.9

(58) Field of Classification Search
USPC .......................... 360/245.8, 245.9, 246, 244.1
See application file for complete search history.

(56) References Cited

U.S. PATENT DOCUMENTS

| | | | |
|---|---|---|---|
| 5,717,547 A | 2/1998 | Young | |
| 6,249,404 B1 * | 6/2001 | Doundakov et al. | 360/245.4 |
| 8,111,483 B2 | 2/2012 | Arai | |
| 8,300,363 B2 * | 10/2012 | Arai et al. | 360/245.8 |
| 8,488,279 B1 | 7/2013 | Pan et al. | |
| 2011/0048791 A1 * | 3/2011 | Ohsawa et al. | 174/267 |
| 2011/0149441 A1 * | 6/2011 | Alex et al. | 360/245.8 |
| 2012/0081815 A1 * | 4/2012 | Arai et al. | 360/245.8 |
| 2013/0107488 A1 | 5/2013 | Arai | |
| 2013/0141821 A1 * | 6/2013 | Pro et al. | 360/245.9 |
| 2013/0176645 A1 * | 7/2013 | Arai | 360/245.8 |

FOREIGN PATENT DOCUMENTS

JP 2010-267334 A 11/2010

OTHER PUBLICATIONS

U.S. Appl. No. 13/733,317, filed Jan. 3, 2013; First Named Inventor: Hajime Arai; Title: "Interleaved Circuit of Flexure for Disk Drive".

* cited by examiner

*Primary Examiner* — Will J Klimowicz

(74) *Attorney, Agent, or Firm* — Holtz, Holtz, Goodman & Chick, PC

(57) ABSTRACT

An interleaved circuit has first branch conductors branching from a first conductor, second branch conductors branching from a second conductor, a metal base, an insulating layer of a dielectric, and a cover resin layer. The metal base comprises an opening. The first branch conductors and the second branch conductors are arranged alternately in a transverse direction of the insulating layer. A slit is formed in the insulating layer and the cover resin layer. The slit comprises a pair of opposite walls and an air gap between the opposite walls. Air introduced into the air gap forms an air layer. The slit extends longitudinally relative to the interleaved circuit along at least a part of the branch conductors.

11 Claims, 10 Drawing Sheets

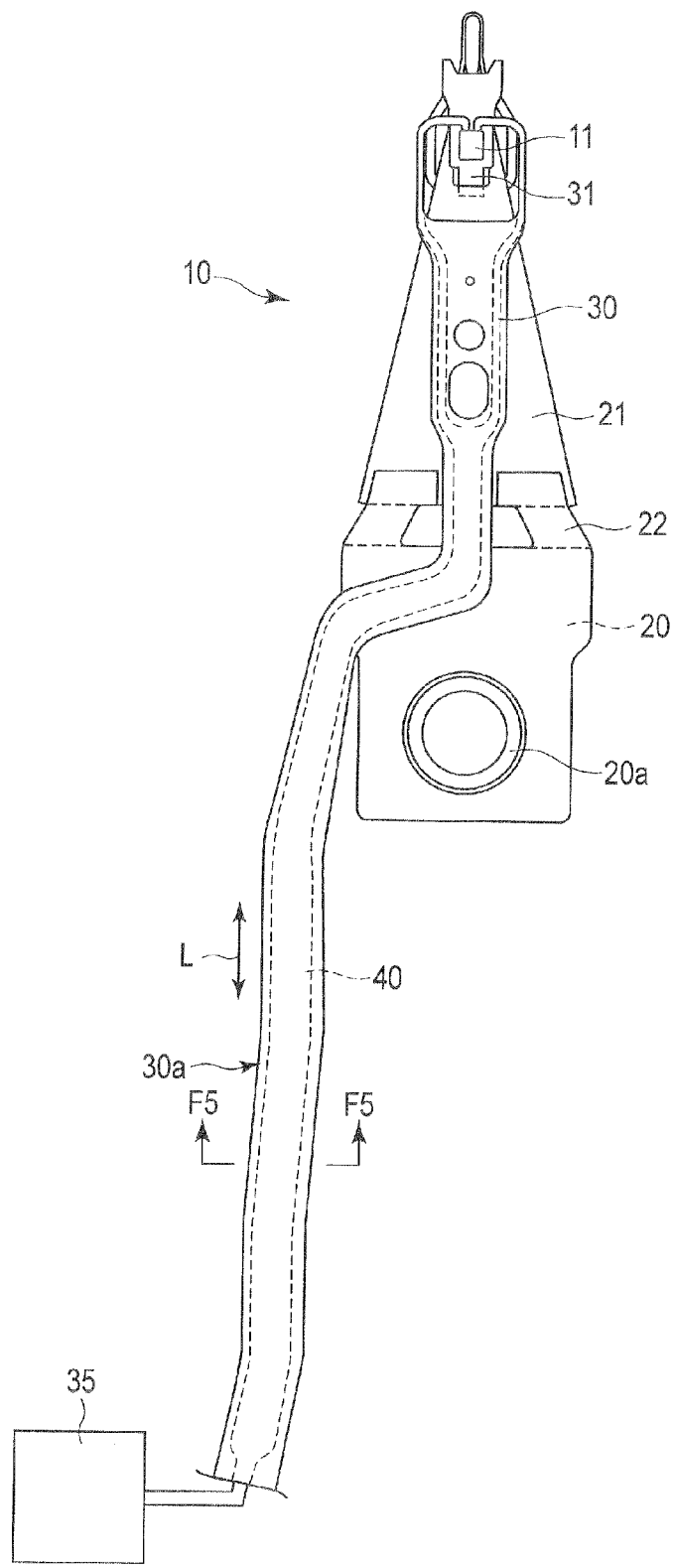
F I G. 3

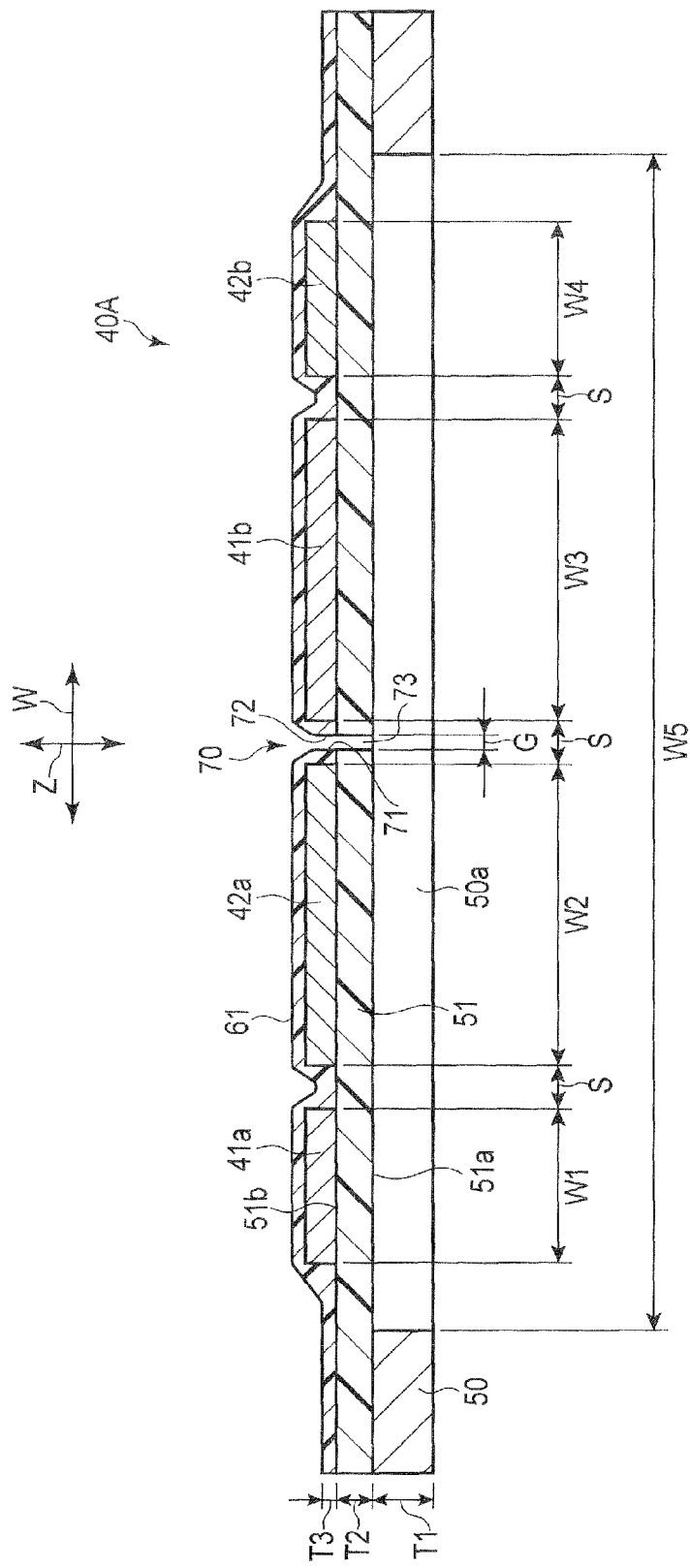
F I G. 5

INTERLEAVED CIRCUIT OF FLEXURE FOR DISK DRIVE

CROSS-REFERENCE TO RELATED APPLICATIONS

This application is based upon and claims the benefit of priority from prior Japanese Patent Application No. 2012-000530, filed Jan. 5, 2012, the entire contents of which are incorporated herein by reference.

BACKGROUND OF THE INVENTION

1. Field of the Invention

This invention relates to an interleaved circuit of a flexure used in a disk drive for an information processing apparatus, such as a personal computer.

2. Description of the Related Art

A hard disk drive (HDD) is used in an information processing apparatus, such as a personal computer. The HDD comprises a magnetic disk rotatable about a spindle, a carriage turnable about a pivot, etc. A disk drive suspension is disposed on an arm of the carriage.

The disk drive suspension comprises a baseplate, load beam, etc. A flexure is disposed on the load beam. A slider is mounted on a gimbal portion formed near the distal end of the flexure. The slider is provided with elements (transducers) for accessing data, that is, for reading or writing data. The suspension, flexure, etc., constitute a head gimbal assembly.

Flexures are practically available in various forms depending on required specifications. A flexure with conductors is a known example. A circuit of the flexure of this type comprises a metal base, insulating layer formed on the metal base, a plurality of conductors formed on the insulating layer, etc. The metal base is formed of a thin plate of stainless steel. The insulating layer consists mainly of an electrically insulating material, such as polyimide. Each conductor is a copper member, one end of which is connected to an element (e.g., magnetoresistive element) of a slider. The other end of the conductor is connected to an amplifier or the like of a disk drive.

The circuit of the flexure is expected to be reduced in impedance, in order to match the amplifier with the element of the slider and reduce energy consumption. A reduction in inductance is also required. To achieve high-speed data transfer, moreover, such characteristics (low-attenuation broadband characteristics) are required that the attenuation is low even in a high-frequency range.

These requirements can be effectively satisfied by a flexure with conductors that comprises multi-trace transmission lines. A circuit with multi-trace transmission lines is also called an interleaved circuit. Examples of flexures with conductors comprising an interleaved circuit are disclosed in U.S. Pat. No. 5,717,547 (Patent Document 1) and Jpn. Pat. Appln. KOKAI Publication No. 2010-267334 (Patent Document 2).

A conventional interleaved circuit comprises a metal base, insulating layer formed on the metal base, a plurality of (e.g., two) branch conductors branching from a first conductor, and a plurality of (e.g., two) branch conductors branching from a second conductor. These branch conductors are formed on the insulating layer and covered by a cover resin layer. A flexure with conductors comprising such an interleaved circuit is said to be low in attenuation in a high-frequency band and suitable for high-speed data transfer.

In the interleaved circuit described above, the frequency band can be enhanced by forming an opening in a part (that part on which the branch conductors are arranged) of the metal base. However, the interleaved circuit in which the opening is simply formed in the metal base can only limitedly achieve low-loss broadband characteristics.

BRIEF SUMMARY OF THE INVENTION

Accordingly, the object of the present invention is to provide an interleaved circuit of a flexure for a disk drive, capable of improving the frequency band.

An interleaved circuit according to one embodiment comprises a metal base comprising an opening, an electrically insulating layer located overlapping that region of the metal base which comprises the opening and consisting mainly of a dielectric (e.g., polyimide) comprising a first surface facing the metal base and a second surface opposite to the first surface, a plurality of first branch conductors branching from a first conductor and arranged on the second surface of the insulating layer, a plurality of second branch conductors branching from a second conductor and arranged along the first branch conductors on the second surface of the insulating layer, and a slit formed along the first branch conductors and/or the second branch conductors in the insulating layer. The slit comprises a pair of opposite walls and an air gap formed between the opposite walls.

According to this arrangement, a wider bandwidth can be provided as compared with the case of a conventional interleaved circuit, so that the frequency band can be improved.

In one embodiment, the interleaved circuit may comprise an electrically insulating cover resin layer covering the first branch conductors and the second branch conductors, and the slit may be formed in each of the cover resin layer and the insulating layer. Further, the slit may be formed in a position facing the opening of the metal base. Alternatively, a plurality of the slits may be arranged transversely relative to the insulating layer. The frequency band can be further improved by increasing the number of slits. Furthermore, a plurality of the slits may be formed on a straight line extending longitudinally relative to the insulating layer, and the interleaved circuit may comprise a junction located between the slits and connecting the opposite walls.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a plan view of a head gimbal assembly comprising a flexure for a disk drive according to a first embodiment;

FIG. 5 is a partial sectional view of the interleaved circuit taken along line F5-F5 of FIG. 3;

DETAILED DESCRIPTION OF THE INVENTION

A first embodiment will now be described with reference to FIGS. 1 to 5.

Figure 1:
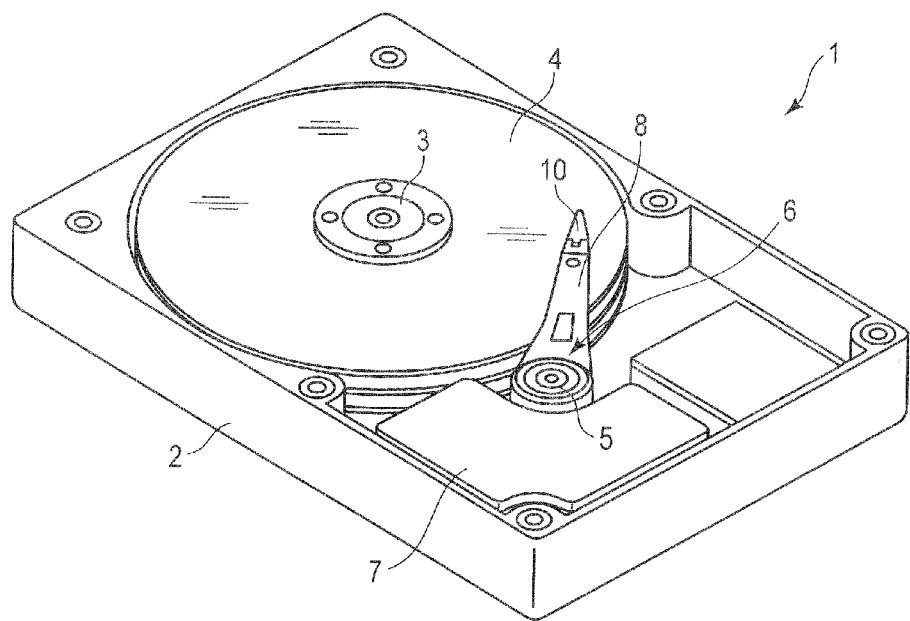
FIG. 1 is a perspective view showing an example of a disk drive with a suspension.

A hard disk drive (hereinafter referred to as the disk drive) 1 shown in FIG. 1 comprises a case 2, spindle 3, magnetic disks 4, pivot 5, carriage 6, and positioning motor 7. The magnetic disks 4 are rotatable about the spindle 3, while the carriage 6 is turnable about the pivot 5. The positioning motor 7 serves to turn the carriage 6. The case 2 is sealed by a lid (not shown).

Figure 2:
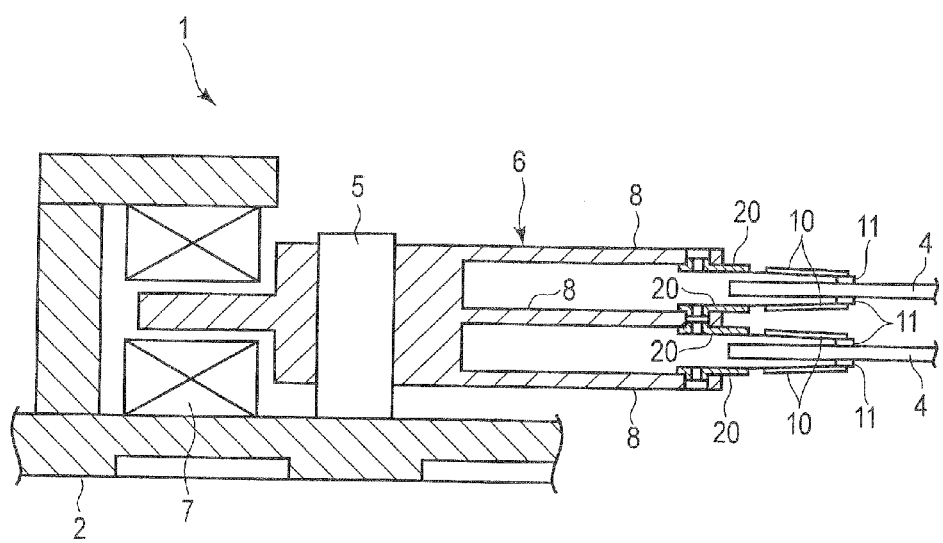
FIG. 2 is a partial sectional view of the disk drive shown in FIG. 1.

FIG. 2 is a sectional view schematically showing a part of the disk drive 1. As shown in FIG. 2, the carriage 6 comprises a plurality (e.g., three) of actuator arms 8. A suspension 10 is mounted on the distal end portion of each arm 8. A slider 11, which constitutes a magnetic head, is disposed on the distal end of the suspension 10.

Each magnetic disk 4 is rotated about the spindle 3 at high speed, an air bearing is formed between the disk and the slider 11. If the carriage 6 is turned by the positioning motor 7, the slider 11 can be moved to a desired track of the disk 4. Elements, such as magnetoresistive elements (MR elements) capable of conversion between electrical and magnetic signals, are disposed on the slider 11. These elements serve to access a recording surface of the disk 4, that is, write or read data to or from the disk.

FIG. 3 shows an example of a head gimbal assembly comprising the suspension 10. The suspension 10 comprises a baseplate 20, load beam 21, hinge portions 22, etc. A boss portion 20a of the baseplate 20 is secured to its corresponding arm 8. The load beam 21 is, for example, 30 to 62 μm thick.

A flexure with conductors 30 is disposed on the suspension 10. The flexure with conductors 30 will hereinafter be referred to simply as the flexure 30. The flexure 30 is located along the load beam 21 and secured to the load beam 21 by fixing means, such as laser spot welding. A tongue 31 that functions as a gimbal portion is formed near the distal end portion of the flexure 30. The slider 11 is mounted on the tongue 31. A rear portion (tail portion) 30a of the flexure 30 extends rearward relative to the baseplate 20 and toward an amplifier 35.

A circuit 40 that extends longitudinally (in the direction indicated by arrow L in FIG. 3) relative to the flexure 30 of the suspension 10 is disposed on the flexure 30. One end of the circuit 40 is connected to the elements of the slider 11 that functions as a magnetic head. The other end of the circuit 40 is connected to the amplifier 35 (FIG. 3) of the disk drive 1 through a circuit board or junction circuit. The circuit 40 comprises an interleaved circuit, which will be described below.

Figure 4:
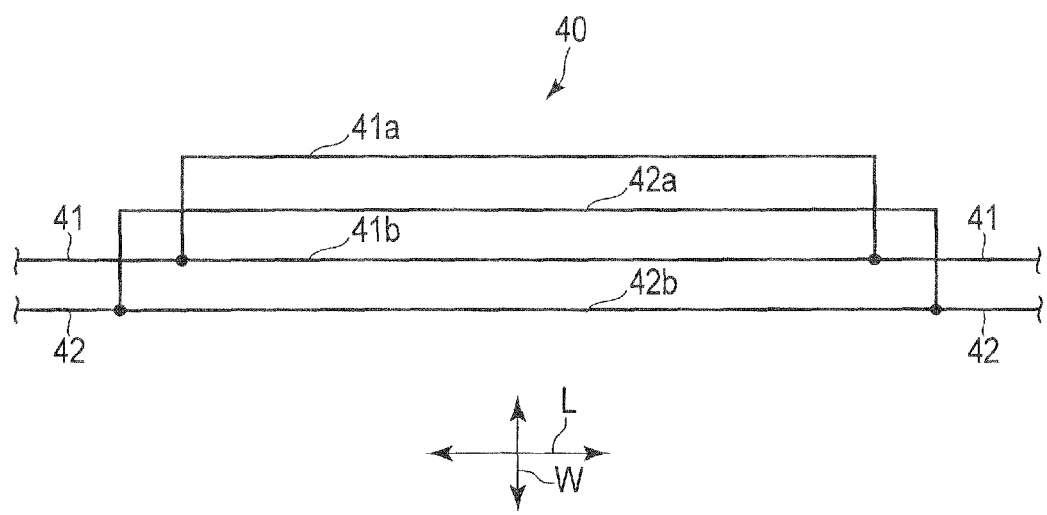
FIG. 4 is a circuit diagram schematically showing an interleaved circuit of the disk drive flexure shown in FIG. 3.

FIG. 4 is a circuit diagram schematically showing the interleaved circuit. Arrow L in FIG. 4 indicates the longitudinal direction of the flexure 30, that is, the longitudinal direction of the interleaved circuit. The interleaved circuit comprises a first conductor 41 (e.g., positive) and second conductor 42 (e.g., negative). The first conductor 41 is branched into two parts, which constitute first branch conductors 41a and 41b, individually. The second conductor 42 is also branched into two parts, which constitute second branch conductors 42a and 42b, individually. These branch conductors 41a, 41b, 42a and 42b constitute a branch conductor group. The branch conductors of each of the first and second conductors 41 and 42 are not limited to two in number and may be three or more.

As shown in FIG. 4, the inside first branch conductor 41b is located between the second branch conductors 42a and 42b in substantially parallel relation thereto. The second branch conductor 42a is located between the first branch conductors 41a and 41b in substantially parallel relation thereto. Thus, the first branch conductors 41a and 41b and second branch conductors 42a and 42b are arranged alternately and parallel to one another in transverse direction W of the interleaved circuit. These branch conductors 41a to 42b extend longitudinally relative to the flexure 30 in longitudinal direction (reference wiring direction) L of the interleaved circuit.

FIG. 5 shows a cross-section of an interleaved circuit 40A according to the first embodiment in the transverse direction. Arrow W in FIG. 5 indicates the transverse direction of the interleaved circuit 40A. Arrow Z indicates the thickness direction of the interleaved circuit 40A. The interleaved circuit 40A comprises a metal base 50, insulating layer 51 formed on the metal base 50, first branch conductors 41a and 41b and second branch conductors 42a and 42b formed on the insulating layer 51, and cover resin layer 61.

The metal base 50 is formed of a metal plate of, for example, stainless steel. An opening 50a is formed in the metal base 50. The opening 50a extends longitudinally relative to the flexure 30. Thickness T1 of the metal base 50 is smaller than the thickness of the load beam 21. Thickness T1 of the metal base 50 is adjusted to, for example, 15 to 20 μm (e.g., 18 μm). Thickness T2 of the insulating layer 51 is adjusted to, for example, 10 μm.

The insulating layer 51 and cover resin layer 61 consists mainly of an electrically insulating resin or dielectric, such as polyimide. The insulating layer 51 is located in a region that covers the opening 50a of the metal base 50. The insulating layer 51 comprises a first surface 51a that faces the metal base 50 and a second surface 51b opposite to the first surface 51a. The first branch conductors 41a and 41b and second branch conductors 42a and 42b are formed into a predetermined pattern along the second surface 51b of the insulating layer 51 by, for example, plating.

The first branch conductors 41a and 41b and second branch conductors 42a and 42b are made of a highly electrically conductive metal, such as plated copper. For example, the first branch conductors 41a and 41b and second branch conductors 42a and 42b are each 9 μm thick. Distance S (FIG. 5) between the branch conductors is, for example, 15 μm. The respective cross-sections of the first branch conductors 41*a* and 41*b* and second branch conductors 42*a* and 42*b* are substantially rectangular.

Width W1 of the one first branch conductor 41*a* is, for example, 40 μm, and width W2 of the second branch conductor 42*a* is, for example, 80 μm. Width W3 of the other first branch conductor 41*b* is, for example, 80 μm, and width W4 of the second branch conductor 42*b* is, for example, 40 μm. Thus, widths W1 and W4 of the outside branch conductors 41*a* and 42*b* are smaller than widths W2 and W3 of the inside branch conductors 42*a* and 41*b*. Width W5 of the opening 50*a* of the metal base 50 is, for example, 325 μm.

The first branch conductors 41*a* and 41*b* and second branch conductors 42*a* and 42*b* are covered by the cover resin layer 61. The cover resin layer 61, like the insulating layer 51, consists mainly of an electrically insulating resin (dielectric), such as polyimide. Thickness T3 of the cover resin layer 61 is, for example, 4 μm.

A slit 70 is formed between the inside branch conductors 42*a* and 41*b* of the interleaved circuit 40A. The slit 70 comprises a pair of opposite walls 71 and 72 facing each other and an air gap 73 between the walls 71 and 72. The opposite walls 71 and 72 are formed extending along the thickness of the circuit (or in the direction indicated by arrow Z in FIG. 5), covering both the insulating layer 51 and the cover resin layer 61.

The distance (slit width G) between the opposite walls 71 and 72 is, for example, 9 μm. Slit width C according to the present embodiment is smaller than distance S between the branch conductors. Moreover, slit width G is smaller than thickness 12 of the insulating layer 51 and greater than thickness T3 of the cover resin layer 61. The air gap 73 communicates with the opening 50*a* of the metal base 50. Air (atmosphere) introduced into the air gap 73 forms an air layer.

The following is a description of manufacturing processes for the interleaved circuit 40A.

The first branch conductors 41*a* and 41*b* of the predetermined pattern are formed on the insulating layer 51 by plating or etching. Thereafter, the cover resin layer 61 is coated on the branch conductors 41*a* to 42*b* to cover them.

Further, the slit 70 is formed by means of a tool, such as a laser beam machine or dicing saw. The slit 70 is located in a position corresponding to the opening 50*a* of the metal base 50. Thus, a laser beam emitted for the formation of the slit 70 or the dicing saw or other tool can be prevented from interfering with the metal base 50. In other words, the slit 70 can be machined without being hindered by the metal base 50.

The means for forming the slit 70 is not limited to post-processing using the laser beam or dicing saw. For example, the slit 70 is first formed in the insulating layer 51 by masking for the formation of the insulating layer. Then, the branch conductors 41*a* to 42*b* are formed and the cover resin layer 61 is coated thereafter. During this coating, the slit 70 is formed in the cover resin layer 61 by masking, corresponding in position to the slit 70 in the insulating layer 51. This process can also be used for the slit formation.

Since the insulating layer 51 and cover resin layer 61 both consist mainly of an electrically insulating dielectric, such as polyimide, they undergo dielectric polarization when subjected to an electric field. This dielectric polarization may sometimes cause a dielectric loss in the interleaved circuit. According to the present embodiment, in contrast, the slit 70 is formed in the insulating layer 51 and cover resin layer 61. Further, the air gap 73 between the opposite walls 71 and 72 of the slit 70 forms an air layer. Thus, a dielectric loss in the interleaved circuit 40A can be reduced.

Figure 6:
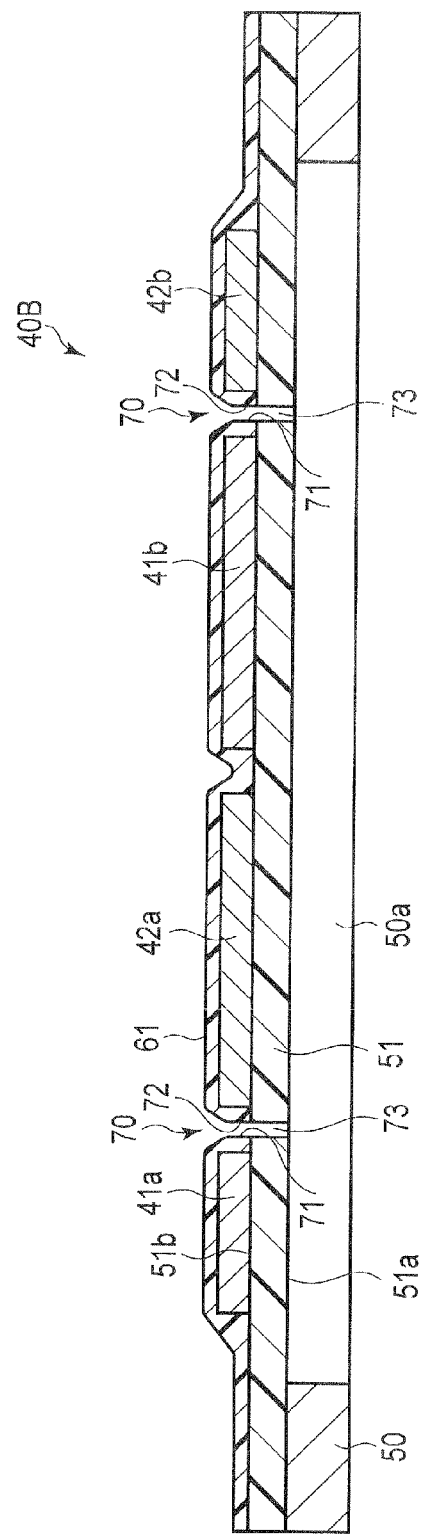
FIG. 6 is a sectional view of an interleaved circuit according to a second embodiment.

FIG. 6 shows an interleaved circuit 40B according to a second embodiment. The interleaved circuit. 40B comprises two slits 70 arranged transversely relative to an insulating layer 51. These slits 70 are formed extending parallel to each other. The one slit 70 on the left-hand side of FIG. 6 is formed between an outside first branch conductor 41*a* and inside second branch conductor 42*a*. The other slit 70 on the right-hand side is formed between an inside first branch conductor 41*b* and outside second branch conductor 42*b*. Since the other configurations of the interleaved circuit 40B are the same as those of the interleaved circuit 40A of the first embodiment (FIG. 5), common numbers are used to designate common parts of the first and second embodiments, and a repeated description of those parts is omitted.

Figure 7:
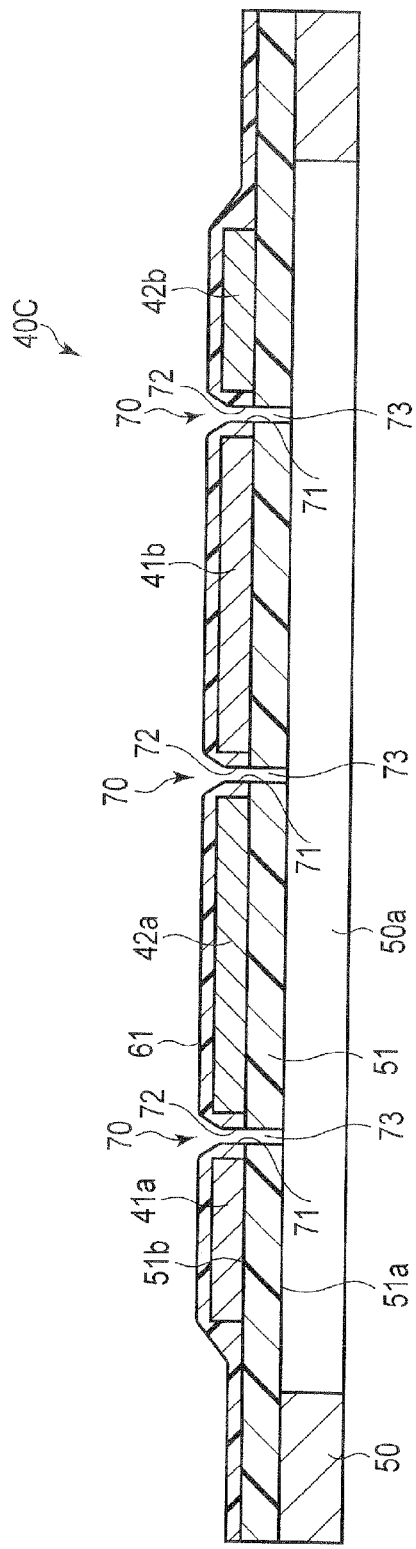
FIG. 7 is a sectional view of an interleaved circuit according to a third embodiment.

FIG. 7 shows an interleaved circuit 40C according to a third embodiment. The interleaved circuit 40C comprises three slits 70 arranged transversely relative to an insulating layer 51. These slits 70 are formed extending parallel to each other. The central slit 70 is formed between an inside first branch conductor 41*b* and second branch conductor 42*a*. Since the other configurations of the interleaved circuit 40C are the same as those of the interleaved circuit 40B of the second embodiment (FIG. 6), common numbers are used to designate common parts of the second and third embodiments, and a repeated description of those parts is omitted.

Figure 8:
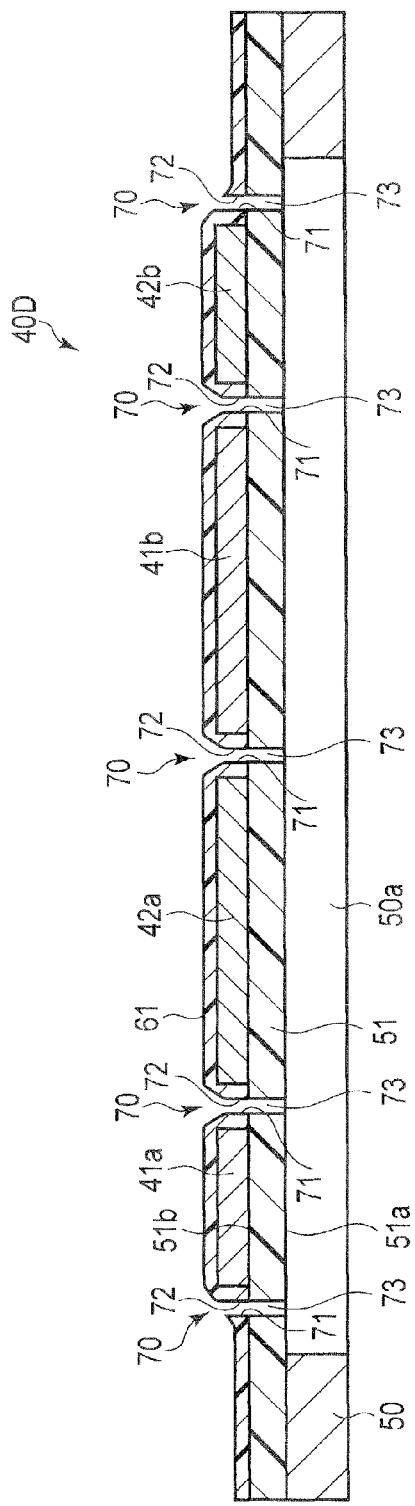
FIG. 8 is a sectional view of an interleaved circuit according to a fourth embodiment.

FIG. 8 shows an interleaved circuit 400 according to a fourth embodiment. The interleaved circuit 40D comprises five slits 70 arranged transversely relative to an insulating layer 51. These slits 70 are formed extending parallel to each other. In the case of this fourth embodiment, three of the slits 70 are formed in the same positions as in the third embodiment, and the other slits 70 are formed individually near the opposite sides of the interleaved circuit 409, that is, outside first and second branch conductor 41*a* and 42*b*. Since the other configurations of the interleaved circuit 40D are the same as those of the interleaved circuit 40C of the third embodiment (FIG. 7), common numbers are used to designate common parts of the third and fourth embodiments, and a repeated description of those parts is omitted.

Figure 9:
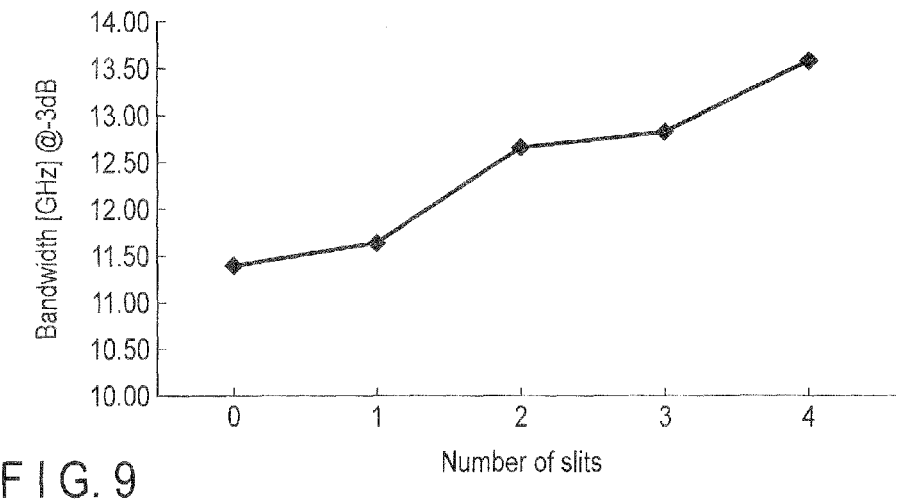
FIG. 9 is a diagram showing the relationship between the number of slits and bandwidth according to the first to fourth embodiments.

FIG. 9 shows a bandwidth (with a loss of 3 dB or less) according to the first to fourth embodiments. As seen from FIG. 9, the larger the number of slits, the greater the bandwidth is. This is because the number of air gaps increases if the slits increase. Any of the interleaved circuits of the first to fourth embodiments can be designed for broadband applications at 11.5 GHz or more and is suitable for high-speed signal transmission.

Figure 10:
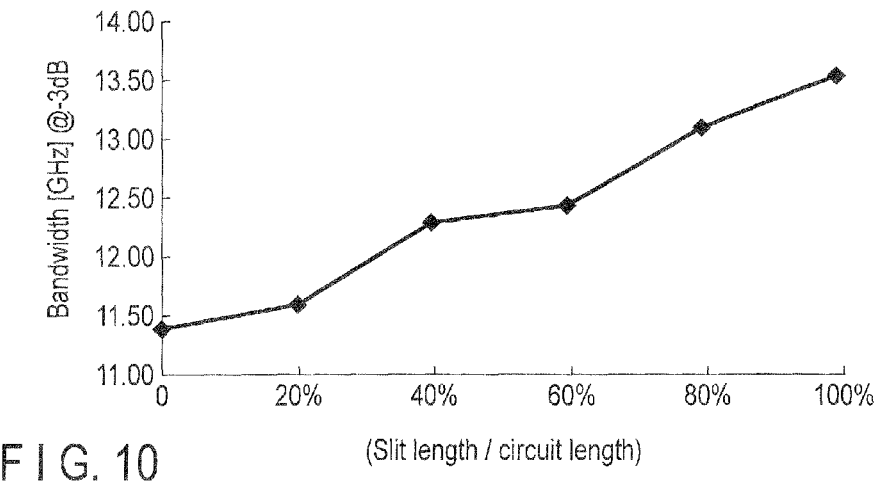
FIG. 10 is a diagram showing the relationship between the bandwidth and the ratio of the length of each slit to that of the circuit.

FIG. 10 shows the relationship between the bandwidth and the ratio of the length of each slit to that of the circuit. The number of slits is five. As seen from FIG. 10, the higher the ratio of the slit length to the circuit length, the greater the bandwidth (with a loss of 3 dB or less) is. A frequency band that bears comparison with that obtained with a 60% slit length can be obtained in the vicinity of a 40% slit length.

Thus, according to the first to fourth embodiments, the slit or slits 70 are formed in the insulating layer 51 and cover resin layer 61 of polyimide of the interleaved circuit. The frequency band was able to be improved by forming the air gaps 73 by means of the slits 70. Also, it was found that the frequency band can be further improved by increasing the number of air gaps 73, that is, by increasing the slits 70. Furthermore, the frequency band was able to be improved by increasing the ratio of the slit length to the interleaved circuit length.

Figure 11:
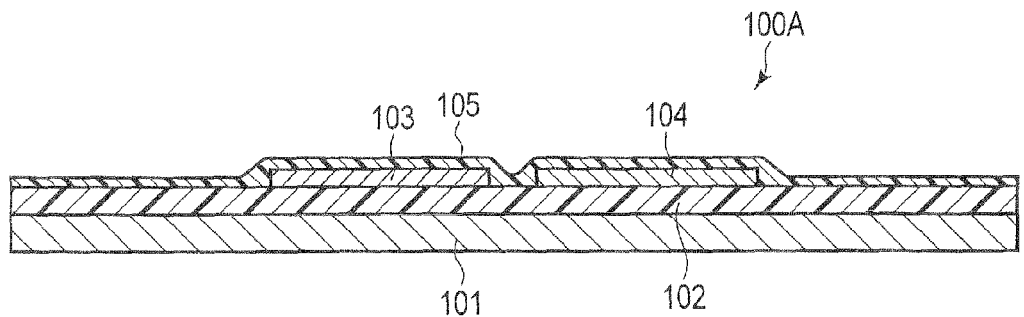
FIG. 11 is a sectional view of a circuit of a first comparative example.
Figure 12:
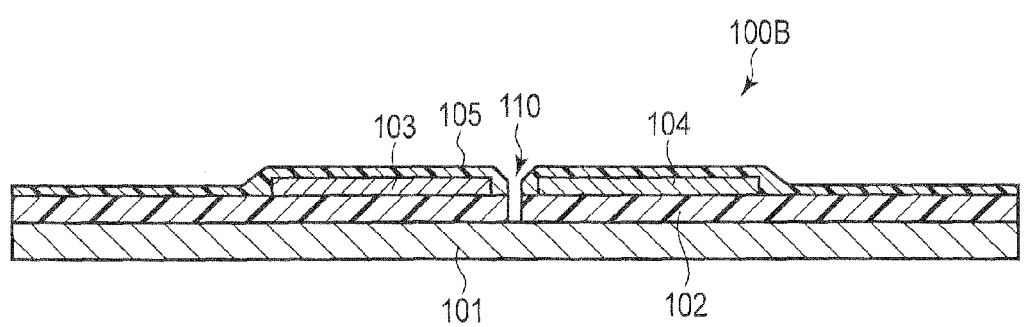
FIG. 12 is a sectional view of a circuit of second comparative example.
Figure 13:
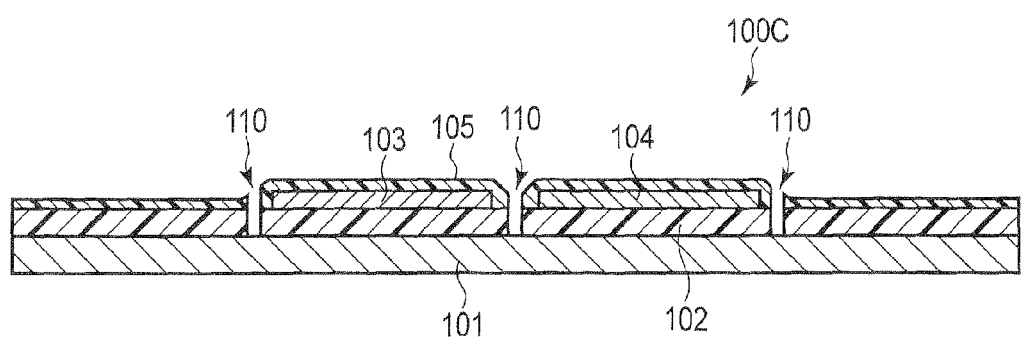
FIG. 13 is a sectional view of a circuit of a third comparative example.

FIG. 11 shows a circuit 100A of a first comparative example. The circuit 100A comprises a metal base 101, insulating layer 102, a pair of conductors 103 and 104, and cover resin layer 105. This circuit 100A is not formed with a slit. FIG. 12 shows a circuit 100B of a second comparative example. This circuit 100B comprises a slit 110 between conductors 103 and 104. FIG. 13 shows a circuit 100C of a third comparative example. This circuit 100C comprises three slits 110 arranged transversely relative to an insulating layer 102. None of these comparative examples is disclosed.

Figure 14:
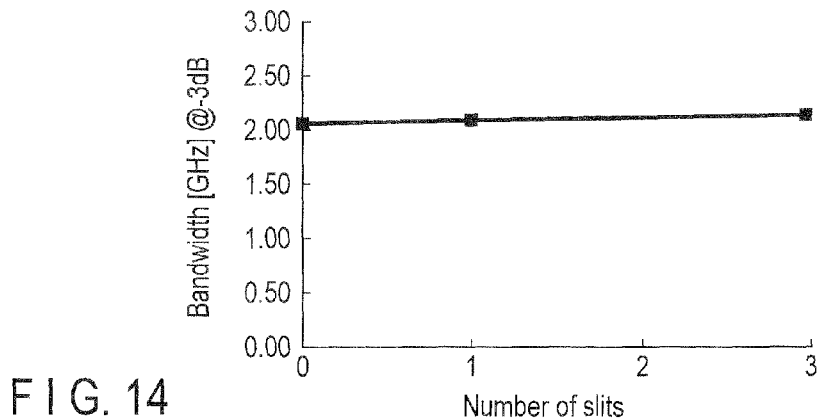
FIG. 14 is a diagram showing the relationship between the number of slits and bandwidth according to the first to third comparative examples.

FIG. 14 shows the bandwidth (with a loss of 3 dB or less) for the circuits 100A to 100S of the first to third comparative examples. In the cases of the first to third comparative examples, as seen from FIG. 14, the bandwidth is hardly improved despite the increase in the number of slits. This is because the circuits 100A to 100C of the first to third comparative examples are not interleaved circuits.

Figure 15:
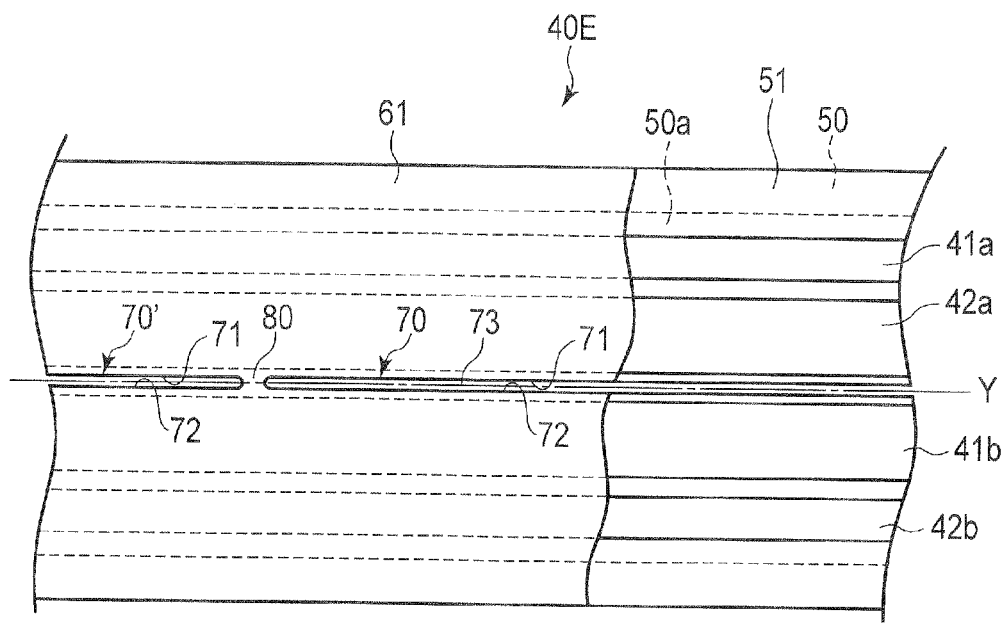
FIG. 15 is a partially cutaway plan view of an interleaved circuit according to a fifth embodiment.

FIG. 15 is a plan view showing a part of an interleaved circuit 40E according to a fifth embodiment. This interleaved circuit 401 is formed with a plurality of slits 70 and 70' on a straight line Y that extends longitudinally relative to an insulating layer 51. The insulating layer 51 and a cover resin layer 61 are formed with a junction 80 between the slits 70 and 70'. The junction 80 connects respective opposite walls 71 and 72 of the slits 70 and 70'. In the case of this interleaved circuit 401, the junction 80 exists between the adjacent slits 70 and 70'. The junction 80 serves to prevent the transversely opposite side portions of the slits 70 and 70' from flapping. Since the other configurations of the interleaved circuit 40E are the same as those of the interleaved circuit 40A of the first embodiment (FIG. 5), common numbers are used to designate common parts of the first and fifth embodiments, and a repeated description of those parts is omitted. The interleaved circuit 40E may be formed with two or more slits 70 arranged transversely relative to the insulating layer 51.

Figure 16:
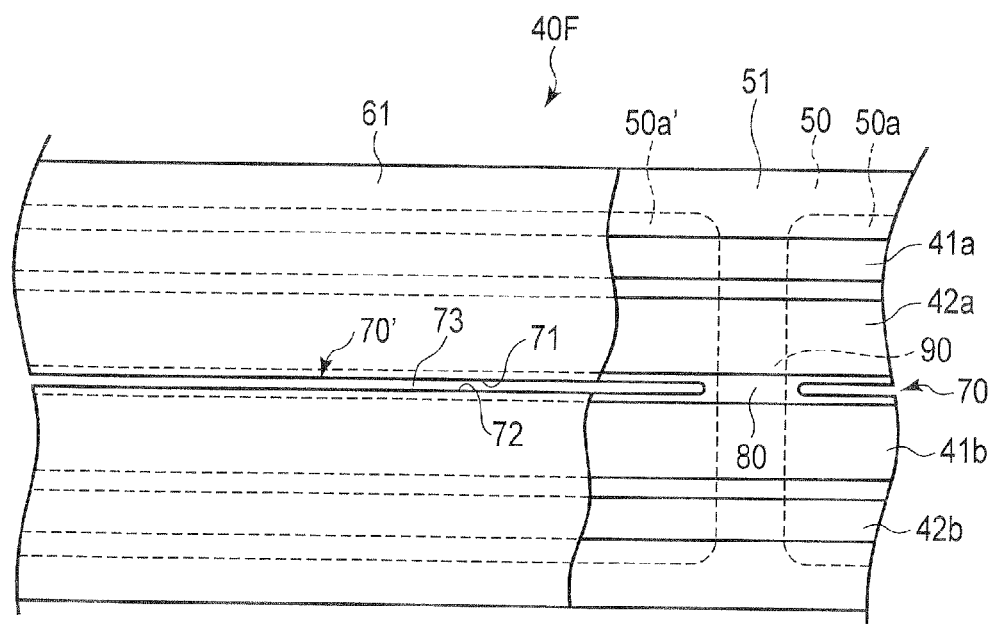
FIG. 16 is a partially cutaway plan view of an interleaved circuit according to a sixth embodiment.

FIG. 16 shows an interleaved circuit 401 according to a sixth embodiment. This interleaved circuit 401 is formed with a plurality of openings 50a and 50a' arranged longitudinally relative to a metal base 50. A bridge portion 90 is formed between the adjacent openings 50a and 50a'. The bridge portion 90 connects the transversely opposite side portions of the openings 50a and 50a. Slits 70 and 70 are formed in positions corresponding to the openings 50a and 50a, respectively. In the case of this interleaved circuit 40F, the bridge portion 90 is formed between the adjacent openings 50a and 50a'. The bridge portion 90 serves to stably support an insulating layer 51 and branch conductors 41a to 42b. The interleaved circuit 40F may be formed with two or more slits 70 arranged in the transverse direction.

According to the first to sixth embodiments, as described above, a part of the insulating layer 51 as a dielectric is formed with the slit 70 along at least a part of each branch conductor. The air gap 73 is formed between the opposite walls 71 and 72 of the slit 70. Thus, a dielectric loss can be reduced to enable broadband applications.

It is to be understood, in carrying out the present invention, that the constituent elements of the invention, including the fir and second conductors, and second branch conductors, cover resin layer, slits comprising the opposite walls, etc., as well as the metal base and insulating layer that constitute the flexure with conductors, may be embodied in various modified forms without departing from the spirit of the invention. In an interleaved circuit that does not comprise the cover resin layer 61, for example, the slit 70 or slits 70 may be formed in the insulating layer only. Further, the first branch conductors may be different in number from the second branch conductors, and/or the former may be as wide as the latter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interleaved circuit of a flexure for a disk drive, which comprises a first conductor and a second conductor, the interleaved circuit comprising:
    a metal base comprising an opening;
    an electrically insulating layer located overlapping that region of the metal base which comprises the opening and consisting mainly of a dielectric comprising a first surface facing the metal base and a second surface opposite to the first surface;
    a plurality of first branch conductors branching from the first conductor and arranged on the second surface of the insulating layer;
    a plurality of second branch conductors branching from the second conductor and arranged along the first branch conductors on the second surface of the insulating layer; and
    a slit formed along the first branch conductors and/or the second branch conductors in the insulating layer and comprising a pair of opposite walls and an air gap formed between the opposite walls.

2. The interleaved circuit of claim 1, comprising an electrically insulating cover resin layer covering the first branch conductors and the second branch conductors, wherein the slit is formed in each of the cover resin layer and the insulating layer.

3. The interleaved circuit of claim 2, wherein the slit is formed in a position facing the opening of the metal base and communicates with the opening.

4. The interleaved circuit of claim 3, wherein a plurality of the slits are formed on a straight line extending longitudinally relative to the insulating layer, the interleaved circuit comprising a junction located between the slits and connecting the opposite walls.

5. The interleaved circuit of claim 2, wherein a plurality of the slits are arranged transversely relative to the insulating layer.

6. The interleaved circuit of claim 2, wherein a plurality of the slits are formed on a straight line extending longitudinally relative to the insulating layer, the interleaved circuit comprising a junction located between the slits and connecting the opposite walls.

7. The interleaved circuit of claim 1, wherein the slit is formed in a position facing the opening of the metal base and communicates with the opening.

8. The interleaved circuit of claim 7, wherein a plurality of the slit arranged transversely relative to the insulating layer.

9. The interleaved circuit of claim 7, wherein a plurality of the slits are formed on a straight line extending longitudinally relative to the insulating layer, the interleaved circuit comprising a junction located between the slits and connecting the opposite walls.

10. The interleaved circuit of claim 1, wherein a plurality of the slits are arranged transversely relative to the insulating layer.

11. The interleaved circuit of claim 1, wherein a plurality of the slits are formed on a straight line extending longitudinally relative to the insulating layer, the interleaved circuit comprising a junction located between the slits and connecting the opposite walls.

* * * * *